(12) United States Patent
Stoney

(10) Patent No.: US 6,505,283 B1
(45) Date of Patent: Jan. 7, 2003

(54) EFFICIENT MEMORY ALLOCATOR UTILIZING A DUAL FREE-LIST STRUCTURE

(75) Inventor: Graham Stoney, Carlingford New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/409,055

(22) Filed: Sep. 30, 1999

(30) Foreign Application Priority Data

Oct. 6, 1998 (AU) .............................................. PP6386

(51) Int. Cl.⁷ .............................................. G06F 12/00

(52) U.S. Cl. ...................................... 711/170; 710/206

(58) Field of Search ................................ 711/128, 112, 711/150, 170, 171, 172; 710/206; 707/100

(56) References Cited

U.S. PATENT DOCUMENTS

| | | | | |
|---|---|---|---|---|
| 5,291,188 A | * | 3/1994 | McIntyre | 345/543 |
| 5,404,474 A | * | 4/1995 | Crook | 711/212 |
| 5,659,739 A | * | 8/1997 | Lubbers | 707/102 |
| 5,784,699 A | * | 7/1998 | McMahon et al. | 711/170 |

OTHER PUBLICATIONS

William Pugh, "Skip Lists: A Probabilistic Alternative to Balanced Trees," Communications of the ACM, Jun. 1990, vol. 33, No. 6., pp. 668–676.

* cited by examiner

Primary Examiner—Matthew Kim
Assistant Examiner—Christian P. Chae
(74) Attorney, Agent, or Firm—Fitzpatrick, Cella, Harper & Scinto

(57) ABSTRACT

A method of dynamically allocating blocks of memory in a computer system (800) is disclosed. The method includes the following steps. Firstly, generating a first memory allocation list in which free memory blocks (S) are recorded on the basis of size. Secondly, generating a second memory allocation list in which free memory blocks (S) are recorded on the basis of memory block address (b). When a memory block (S) is requested by the computer system, searching the first list to determine a suitably sized memory block, allocating the requested memory block from the suitably sized memory block in response to the request, and updating the first and second lists to take the allocation into account. When a memory block (S) is freed by the computer system (800) it is determined whether a free memory block exists adjacent the freed memory block by searching the second list. In the event that one or more free memory blocks exist adjacent the freed memory block, the freed memory block and free memory blocks are merged together to form a unitary free memory block. Finally, the first and second lists are updated to take the freed memory block and any free memory block merges therewith into account.

15 Claims, 9 Drawing Sheets

EFFICIENT MEMORY ALLOCATOR UTILIZING A DUAL FREE-LIST STRUCTURE

FIELD OF INVENTION

The present invention relates to the dynamic allocation of memory within a computer system and, in particular, to a method of lowering fragmentation overheads.

DESCRIPTION OF PRIOR ART

Modern computer systems rely heavily on dynamic memory allocation to provide memory space where data may be stored during processing. The program makes requests to a dynamic memory allocator for varying sized blocks of memory, which are later returned for reuse to the memory allocator when they are no longer required. A dynamic memory allocator typically manages a list of free blocks from which it can satisfy new requests on behalf of the system, and to which blocks which have been released can be returned.

A dynamic memory allocator can form a central part of a computer system, with its allocation services being used extensively by numerous system components. Moreover, allocation of memory must take place efficiently in order to provide the required overall system performance.

To operate efficiently, a memory allocator must meet two requirements: it must manage the overall pool of available memory efficiently, and must respond to allocation and release requests in a timely manner. These two requirements can be contradictory, and conventional dynamic memory allocators attempt to compromise by implementing allocation strategies that lie somewhere on the spectrum between being very fast and being very memory-efficient.

The memory efficiency of a dynamic memory allocator is the degree to which the overall pool of available memory is used effectively. Inefficient memory allocation strategies lead to excessive memory requirements, either increasing overall system cost to provide for inflated memory requirements, or causing system failure when required memory is not available. The degree of memory efficiency of an allocator operating in a particular system is determined by the amount of memory which is unusable because it is broken into fragments which are too small to satisfy requests made by the system.

Fragmentation can occur internally within the allocator as a result of allocation policy, or externally as a result of the combination of the system's allocation profile and the allocator's allocation policy. Both forms of fragmentation represent wastage which degrades the system's overall memory efficiency.

In order to satisfy memory allocation requests in a timely manner, conventional dynamic memory allocators typically maintain a number of separate free lists from which memory blocks are allocated. Each list contains blocks of a fixed size, or within a particular size range, so that an allocation can be satisfied without the need to search the entire free list for a block of the requested size. If the free list corresponding to the requested size is empty, a block from one of the larger sized lists may need to be broken down in order to satisfy the request, contributing to fragmentation and reducing memory efficiency.

Fixed-size free lists are commonly used, where the size of blocks on a given free list may be rounded up to a particular power of two, the next number in a Fibbonacci sequence, or some other easily computable sequence. The amount of memory returned by an allocation request for a block of a particular size will typically include this internal fragmentation due to rounding, which remains unusable by the rest of the system.

External fragmentation occurs as a result of the interaction between allocator policy and system allocation request profile. Blocks are frequently returned to the allocator by the system in an unpredictable order, leaving allocated blocks interspersed between free blocks in memory. A large allocation request may not be satisfiable, because no large contiguous block of free memory is available, notwithstanding the fact that the total amount of memory available would otherwise by sufficient to satisfy the request.

Allocator policy can further contribute to external fragmentation, depending on how often the small blocks which have been returned to the allocator are merged back into large blocks on. a larger sized free list. This merging process typically involves computationally expensive sorting of all the current free lists, which in turn has an impact on allocation speed. As a result, conventional allocators typically defer merging until absolutely necessary, or perform regular merges after a certain number of block allocations or releases, in an attempt to mitigate the undesirable external fragmentation effects caused by storing many small blocks separately on multiple free lists.

Conventional allocators trade off a degree of memory efficiency for speed in a variety of ways, which can lead to poor memory efficiency due to fragmentation.

Dynamic memory allocators also vary according to where they store the free list information used internally by the allocator. In-place allocators store this information in the free blocks themselves, and are commonly used in general purpose single- or multi-processor systems where the processor has a fast data path to the memory being allocated. Out-of-place allocators store the information about the free list in a separate area of memory to that being controlled by the allocator, and may be used to allocate memory on behalf of a co-processor and/or when processor access to the memory being allocated incurs a significant performance penalty.

SUMMARY OF THE INVENTION

In a first aspect, the present invention provides a method of dynamically allocating blocks of memory in a computer system, the method including the steps of:

generating a first memory allocation list in which free memory blocks are recorded on the basis of size;

generating a second memory allocation list in which free memory blocks are recorded on the basis of memory block address;

when a memory block is requested by the computer system, searching the first list to determine a suitably sized memory block, allocating the requested memory block from the suitably sized memory block in response to the request, and updating the first and second lists to take the allocation into account; and when a memory block is freed by the computer system:
   determining whether a free memory block exists adjacent the freed memory block by searching the second list;
   in the event that one or more free memory blocks exist adjacent the freed memory block, merging the freed memory block and free memory blocks together to form a unitary free memory block; and
   updating the first and second lists to take the freed memory block and any free memory block merges therewith into account.

Preferably, the first and second lists are linked list data structures. More preferably, the first and second lists are merged. In a particularly preferred form, the first and second lists take the form of a merged skip-list.

In a second aspect, the present invention provides an apparatus for dynamically allocating blocks of memory in a computer system, the method including the steps of:

allocation list generating means for generating a first memory allocation list in which free memory blocks are recorded on the basis of size and generating a second memory allocation list in which free memory blocks are recorded on the basis of memory block address;

searching means for searching the first list to determine a suitably sized memory block when a memory block is requested by the computer system and, for searching the second list to determine whether a free memory block exists adjacent a freed memory block when the memory block is freed by the computer system;

allocating means for allocating the requested memory block from the suitably sized memory block in response to the request, and updating the first and second lists to take the allocation into account; and merging means for merging the freed memory block and free memory blocks together to form a unitary free memory block in the event that one or more free memory blocks exist adjacent the freed memory block; and updating means for updating the first and second lists to take the freed memory block and any free memory block merges therewith into account.

In a third aspect, the present invention provides a computer storage medium bearing one or more computer software programs for execution on a computer, the computer software program or programs including compiled or uncompiled software instructions for implementing a method of dynamically allocating blocks of memory in a computer system, including instructions for implementing the following steps:

generating a first memory allocation list in which free memory blocks are recorded on the basis of size;

generating a second memory allocation list in which free memory blocks are recorded on the basis of memory block address;

when a memory block is requested by the computer system, searching the first list to determine a suitably sized memory block, allocating the requested memory block from the suitably sized memory block in response to the request, and updating the first and second lists to take the allocation into account; and when a memory block is freed by the computer system:
determining whether a free memory block exists adjacent the freed memory block by searching the second list;
in the event that one or more free memory blocks exist adjacent the freed memory block, merging the freed memory block and free memory blocks together to form a unitary free memory block; and
updating the first and second lists to take the freed memory block and any free memory block merges therewith into account.

BRIEF DESCRIPTION OF DRAWINGS

A preferred embodiment of the present invention will now be described, by way of example only, with reference to the accompanying drawings, in which.

Whilst various aspects of the invention are set out in the numbered paragraphs at the end of this specification, other aspects will be apparent from the detailed description which follows.

Skip lists are used for storing sorted collections of data and will be familiar to those skilled in the art of data manipulation. An explanation of skip lists is given in "Skip Lists: A Probabilistic Alternative to Balanced Trees", William Pugh, Communications of the ACM, June 1990, the contents of which are incorporated herein by cross-reference.

DETAILED DESCRIPTION OF PREFERRED EMBODIMENTS

Figure 1:
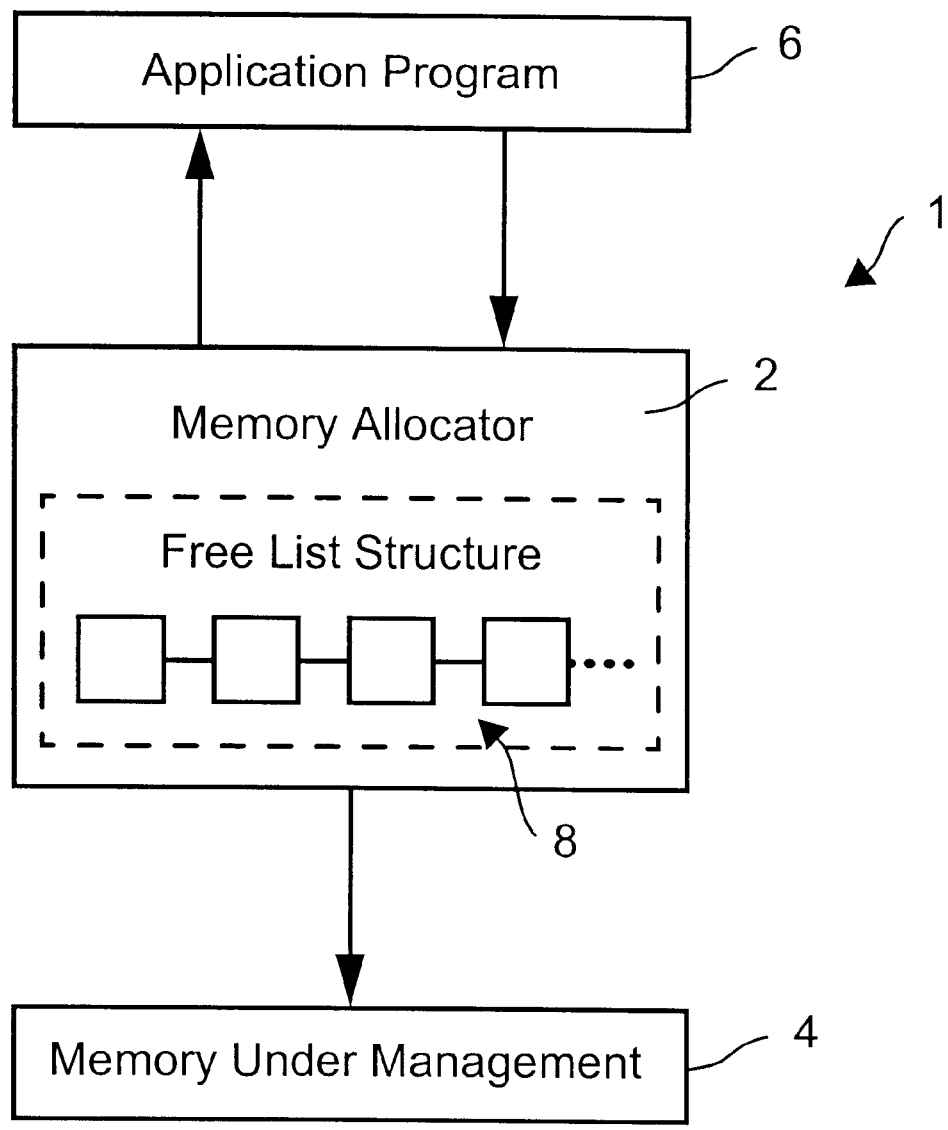
FIG. 1 is a schematic overview of an application requesting a free memory block via a dynamic memory allocator.

As shown in FIG. 1, in a preferred embodiment, there is provided a dynamic memory allocation system 1 including a memory allocator 2, and controlled memory 4. The memory allocator 2 arbitrates requests from application program 6, for free memory blocks of varying size.

In the embodiment shown, the application program is a graphics manipulation program which requires memory for image storage, buffering, and storage of program modules, for example. However, it will be appreciated that the invention can be implemented in relation to any form of program for which memory needs to be allocated.

To ensure that the contents of areas of memory being used by the application program 6 or other applications, the memory allocator 2 maintains a linked free-list 8 which stores the addresses and sizes of free memory blocks.

In the preferred embodiment, the linked free-list 8 is stored using a dual skip-list structure, where each block on the list is effectively linked into two lists at once, each list having a different ordering. One list is ordered by block size (the "size-ordered list"), and is used to locate the best fit block quickly in response to an allocation request. The other list is ordered by memory address (the "address-ordered" list), and is used to allow neighbouring free blocks to be located quickly so that merging can be attempted every time a block is freed.

Skip lists are used because they offer binary search performance similar to a binary tree without the need to rebalance the tree, making the allocator faster, simpler and less error-prone than conventional allocators. Binary trees or other related data structures can also be used to implement the free-list.

Figure 2:
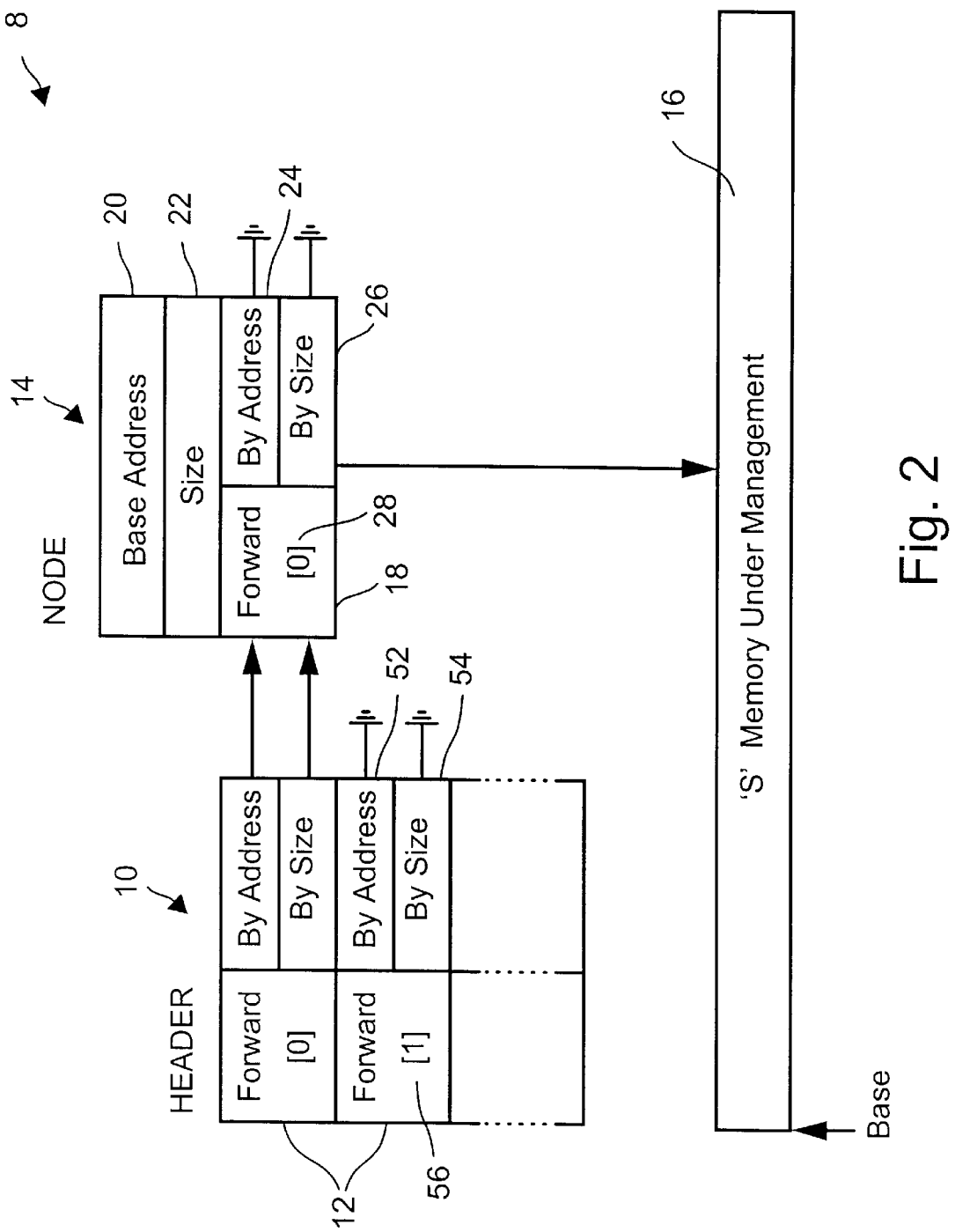
FIG. 2 shows a memory free list according to the invention, along with a simplified representation of associated memory, prior to any memory allocations being performed.

FIG. 2 shows the initial structure of the free-list 8, when all memory is available for allocation as a free memory block S. The free-list includes a header 10 which defines one or more header elements 12, depending upon the size of the free list. The free-list also includes a node 14 representing free memory block 16, the node 14 comprising a node element 18. The node 14 represents a list entry in each of the size-ordered and address-ordered lists. The node element 18 contains:

an address 20 of the free memory block S with which it is associated;

a size 22 (typically in bytes) of the free memory block S; and a dynamically sized array of forward pointer structures, each consisting of a "by address" pointer 24 and a "by size" pointer 26.

The header elements 12 are not associated with a particular memory block, and are used as an initial starting point for a size-based or address-based search. Each header element 12 includes an array of forward pointer structures, each containing a "by address" pointer 52 and a "by size" pointer 54.

At the stage shown in FIG. 2, no memory has been allocated yet, and so there is only a single node 14 referencing a corresponding single free memory block. The "by address" pointer 24 and "by size" pointer 26 point to a null pointer.

Figure 3:
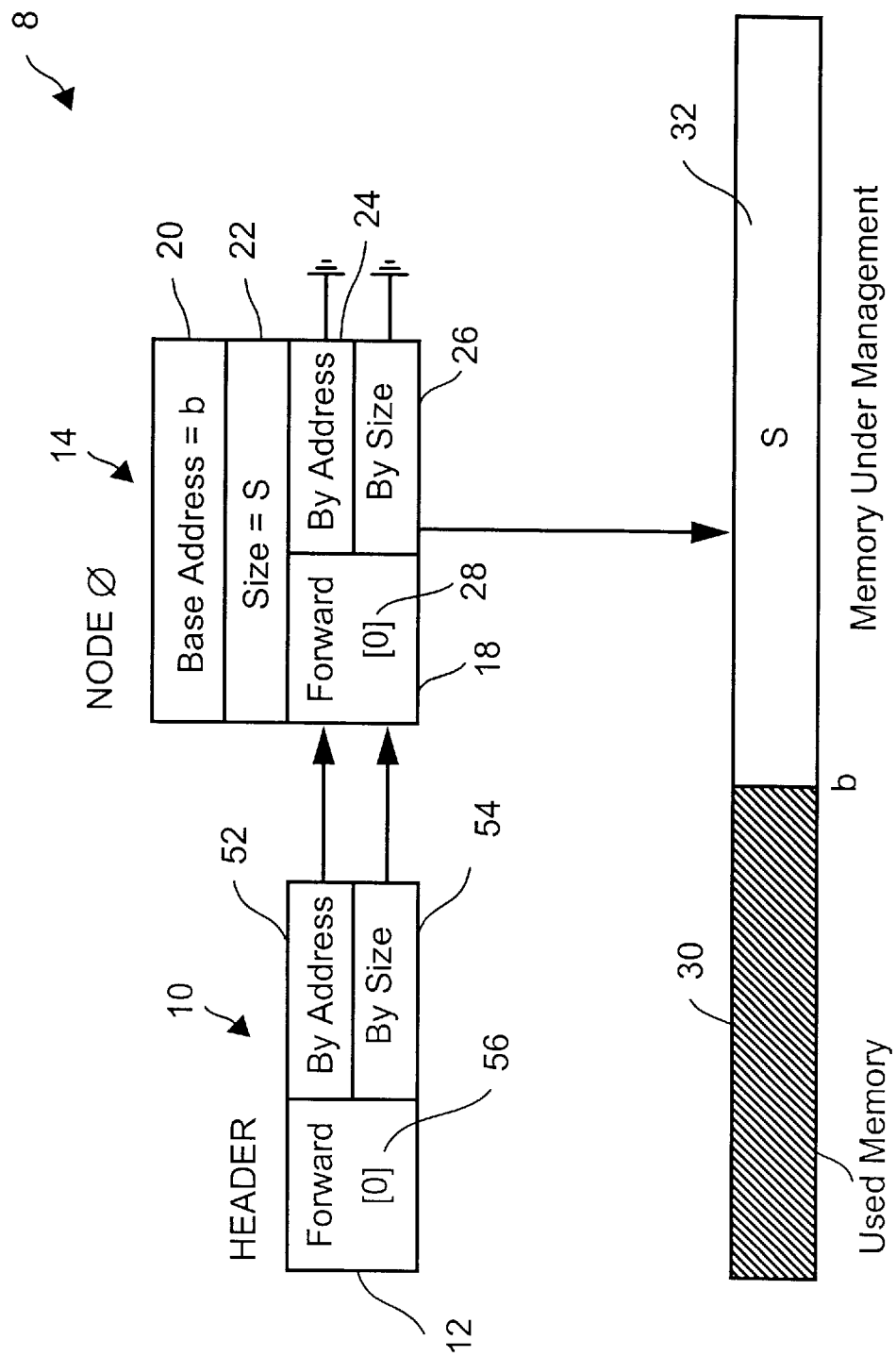
FIG. 3 shows the memory free list and associated memory shown in FIG. 2, after a single memory allocation has been performed.

Turning to FIG. 3, a single memory allocation 30 has been made, leaving a new free memory block 32 having an address b and a size S. The node 14 is updated to reflect the new address and size details.

Figure 4:
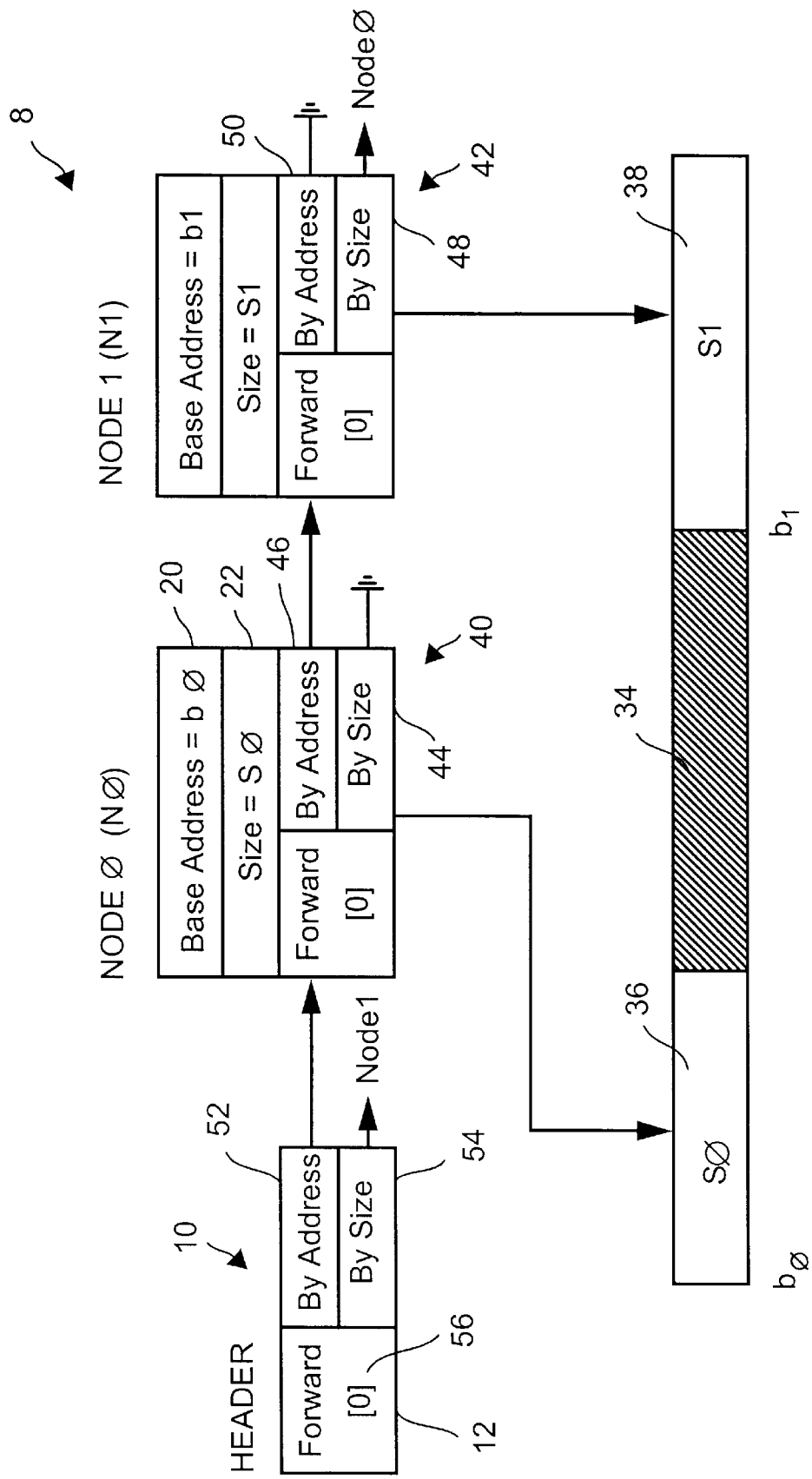
FIG. 4 shows the memory free list and associated memory shown in FIGS. 2 and 3, with two non-contiguous free memory blocks.

In FIG. 4, a memory allocation 34 has been made, leaving two free memory blocks 36 and 38, having addresses b0 and b1, and sizes S0 and S1 respectively. This results in a first node N0 and a second node N1, having respective node elements 40 and 42 respectively. The node element 40 in node N0 contains a "by size" pointer 44 and a "by address" pointer 46, along with the address b0 and size S0 of the associated free memory block 36. Similarly, node element 42 in node N1 contains a "by size" pointer 48 and a "by address" pointer 50, along with the address b1 and size S1 of the associated free memory block 38.

It will be noted that the "by size" and "by address" pointers in a particular node element do not necessarily point to the same node, since the lists with which they are respectively associated are ordered by different keys.

Figure 5A:
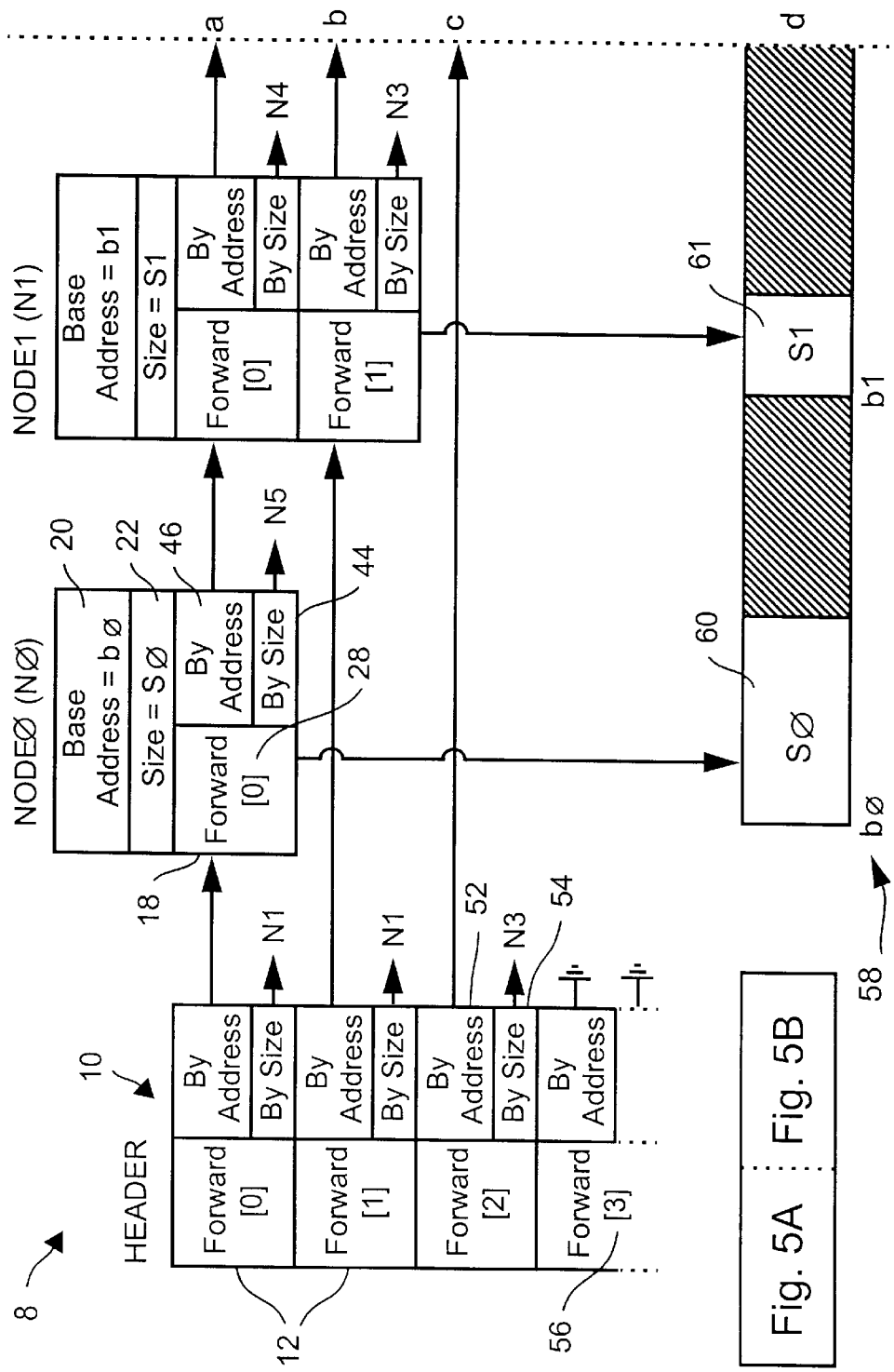
FIG. 5A and 5B show the memory free list and associated memory shown in FIGS. 2 to 4, with a plurality of non-contiguous free memory blocks.
Figure 5B:
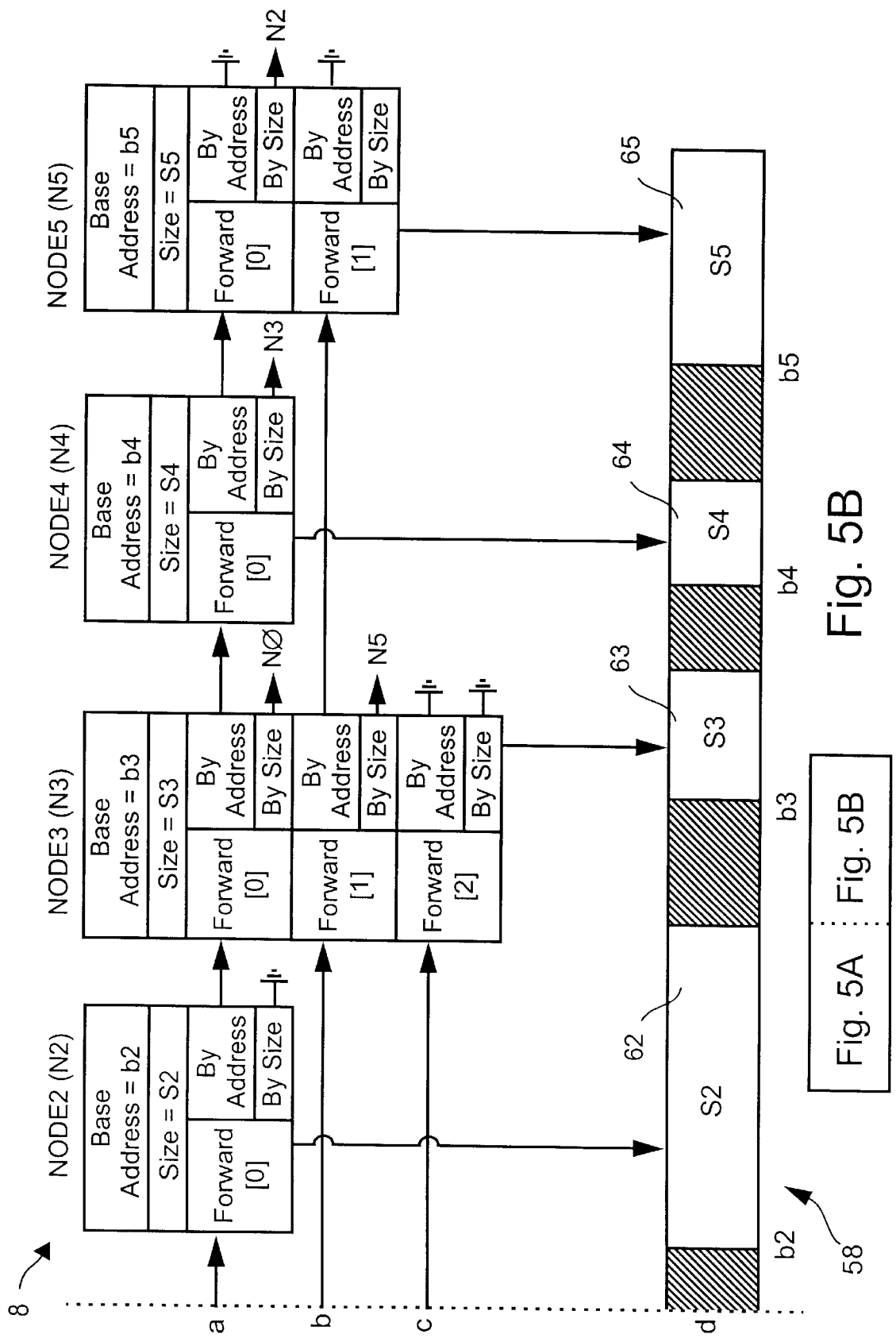

Turning to FIG. 5, there is shown a multiple entry skip list 58 representing a plurality of free memory blocks 60, 61, 62, 63, 64 and 65 at addresses b0, b1, b2, b3, b4 and b5, and having sizes s0, s1, s2, s3, s4 and s5 respectively. Each of free memory blocks 60 to 65 has an associated node, designated N0, N1, N2, N3, N4 and N5 respectively. The level of each node is randomly generated during generation of the free list as memory is allocated. It will be noted that, in many cases, the "by size" pointers 44 and 48 point to a different element than the "by address" pointers 46 and 50 associated with the respective node elements 40 and 42.

The size of each of the nodes N0 to N5 is selected based on a random, pseudo random or heuristic number generation scheme at the time a memory block is entered into the free-list. Whichever scheme is used, the relative numbers of nodes of a given level are selected to follow a predetermined or at least predictable pattern, as will be understood by those skilled in the art of skip-list generation. In the preferred embodiment, a probability p of 0.25 is used to generate the random mode level.

The preferred embodiment is implemented by means of complementary memory block allocation and release processes which are discussed in the following claims.

Allocation Process

Figure 6:
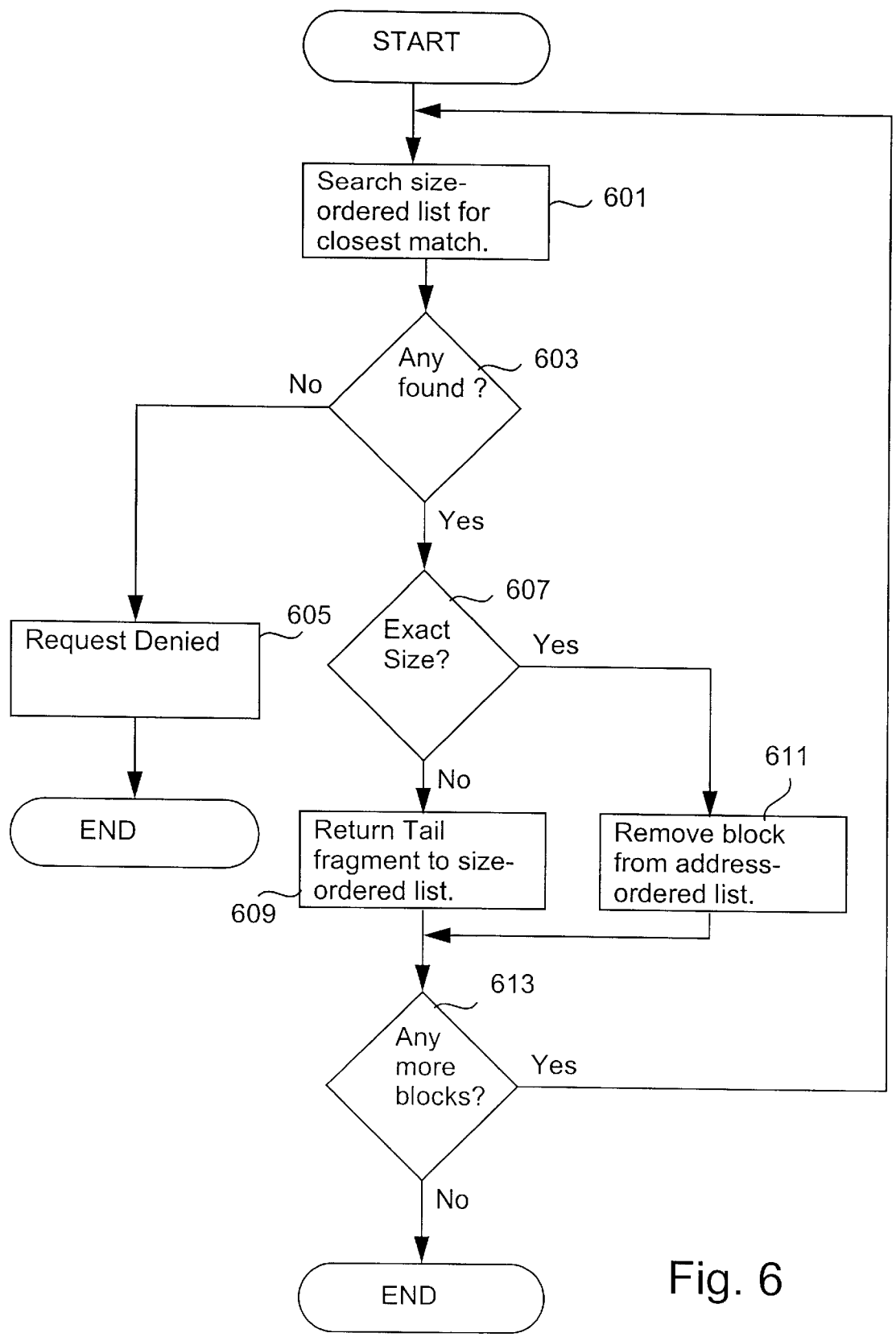
FIG. 6 is a flowchart showing the allocation process in accordance with the preferred embodiment of the present invention.

FIG. 6 is a flowchart showing the allocation process in accordance with the preferred embodiment. The process begins at step 601, where when an allocation request is made the size-ordered list is searched for the next larger block which is closest in size to that requested. During the search, pointers to the previous block on the size-ordered list at each level are recorded to enable the block to be removed from the size-ordered list efficiently, since it will no longer be considered free. At the next step 603, a check is carried out to determine if any blocks have been found. If no blocks have been found, the process proceeds to the next step 605, where the request is denied and the process concludes.

If a block has been found the process proceeds to the next step 607, where the block is checked to see if it is the required size. If the located block is not an exact size match, the tail fragment will be returned to the size-ordered list in the appropriate place according to the fragment's size, at step 609. Alternatively, if there is no tail fragment (because the located block is exactly the required size), the block being allocated is located on the address-ordered list, at step 611, via a search so that it can also be removed from the address-ordered list as discussed below. It will be appreciated that, if there is a tail fragment, it will simply take the place of the original block on the address-ordered list, since it retains the ordering of the original block with respect to its closest neighbours. The process continues to step 613, where if there are more blocks to be allocated the process returns to step 601. The allocation process concludes when all of the blocks in the size-ordered list have been allocated.

Release Process

Figure 7:
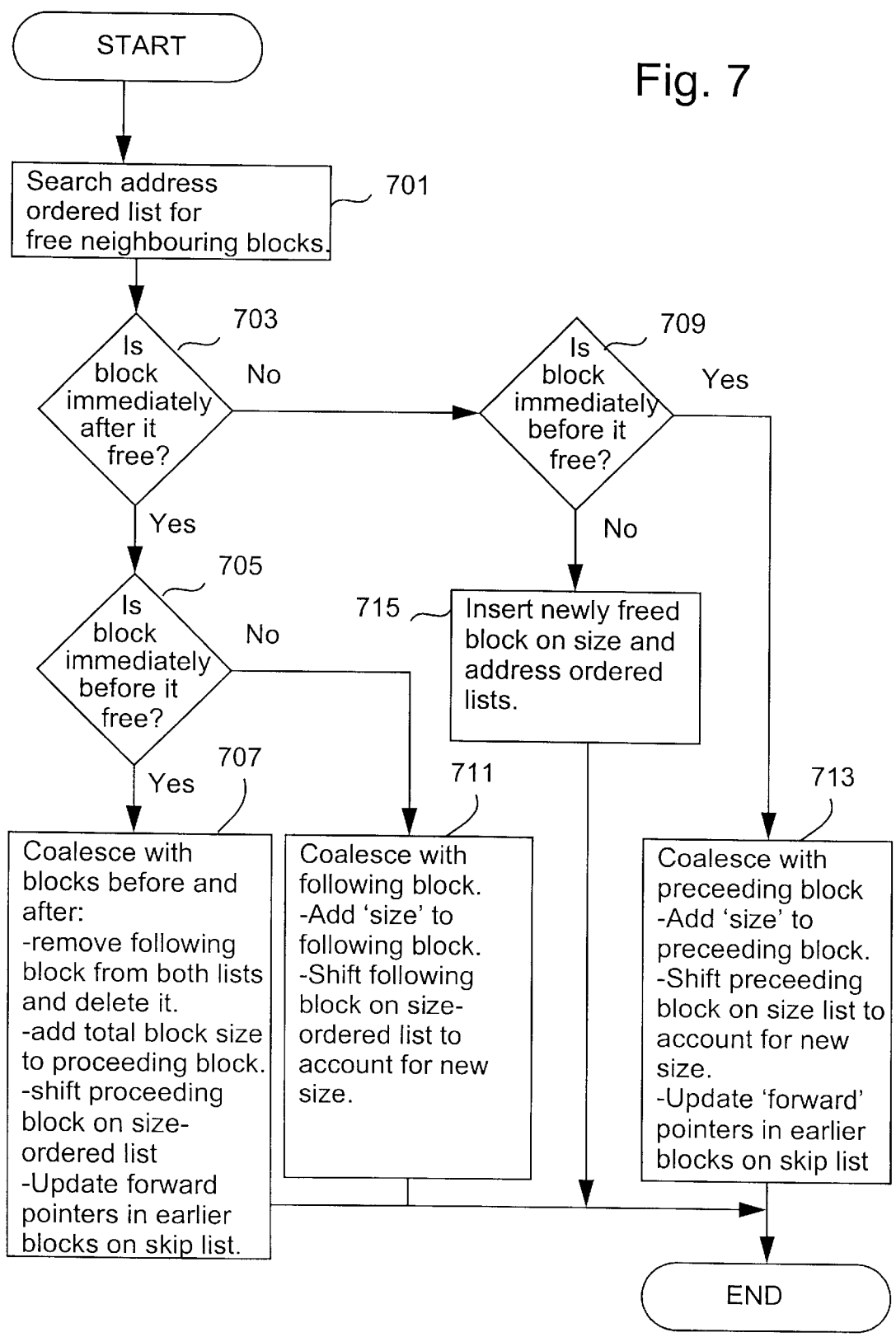
FIG. 7 is a flowchart showing the release process in accordance with the preferred embodiment.

FIG. 7 is a flowchart showing the release process in accordance with the preferred embodiment. The process begins at step 701, where when a block is released to the allocator for later re-use, the address-ordered list is searched to find the nearest free neighbouring blocks to merge with, and the process varies depending on whether the surrounding free blocks are immediately adjacent to the one being freed. At the next step 703, a check is carried out to determine if the block immediately after the one being released is already free. If the block immediately after the one being released is already free, the process proceeds to step 705, where a check is carried out to determine if the block immediately before the one being released is already free. If the block immediately before the one being released is free, all three blocks will be merged into a single new block at the next step 707, which will replace the block in memory before the one being released on the address-ordered list. The block after the released block in memory will be removed from both the address and size ordered lists, and the resulting size from all three blocks will be inserted at the appropriate new position on the size-ordered list, replacing the entry of the previous block on the size-ordered list.

Alternatively, if only the block immediately after the one being released is already free, at step 705, the process proceeds to step 711. At step 711, the newly freed block will be merged with that subsequent block replacing its entry on the address-ordered list, the ordering of which does not change. The subsequent block is removed from the size-ordered list, and re-inserted with the new size resulting from the merge with the block being freed.

If at step 703, the block immediately after the one being released is not free, the process proceeds to step 709, where a check is carried out to determine if the block immediately before the one being released is already free. If only the block immediately before the one being released is already free, the newly freed block will be merged with that previous block at step 713, replacing its entry on the address-ordered list, the ordering of which, again, does not change. Also at step 713, the previous block is removed from the size-ordered list, and re-inserted with the new size resulting from the merge with the block being freed.

If the block immediately before the one being released is not free at step 709, then the process proceeds to step 715, where a new list entry is created and inserted into both the address-ordered and size-ordered lists. The process concludes, at step 717, when the address-ordered list and size-ordered list have been updated.

FIG. 4 shows the structure of the free list from FIG. 3, after a further block has been allocated, and the first allocation released. FIG. 5 shows the structure of the free list after many allocation/release requests, including nodes of different levels.

Object Lifetimes

External fragmentation is heavily influenced by the lifetime of the allocated blocks. General purpose memory allocators typically have no knowledge of external block lifetimes which would allow them to alter the allocation policy to reduce external fragmentation. Object lifetimes can be very difficult to predict, making it difficult for the system to provide such information to the allocator. Furthermore, using this information within an allocator usually has speed penalties.

In a preferred embodiment, these problems are somewhat ameliorated by allowing coarse object lifetime information to be provided by the system, for use by the dynamic allocator. Allocation requests are grouped into two broad classes according to whether they have short or long expected lives, the distinction being drawn semi-arbitrarily by the system. When a larger block from the free list is split to satisfy an allocation request, the block returned will be split off either the top or the bottom of the larger free block depending on the expected lifetime. Noting that the system starts with a single block representing all available memory, blocks with short expected lifetimes tend to group at one end of the memory pool, while blocks with long lives tend to group together at the other. This provides a coarse object lifetime grouping which provides a significant first order reduction in external fragmentation with no performance penalty. In the preferred embodiment, information about object lifetime is passed to the allocator by the polarity of the block size data, with a negative value indicating a relatively short expected lifetime and a positive value indicating a relatively long expected lifetime. When the application or system making a request for a memory block allocation is not aware of the concept of object lifetimes, it can provide conventional positive signed requests without penalty.

Alignment

In some cases, objects can require strict alignment constraints in terms of memory addressing. In a preferred embodiment, blocks can be aligned to addresses of any arbitrary multiple, by searching along the level 0 size list from the point where the best fit block is found. The search terminates when a block with both the required size and alignment is found, or when a block which could be fragmented to generate such a block is found. In the preferred embodiment, the alignment requested must be a power of 2.

Although the invention has been described with reference to a number of specific embodiments, it will be appreciated by those skilled in the art that the invention can be embodied in many other forms. For example, although the embodiments described use out-of-place storage of the free-list, the invention can also be implemented using in-place storage.

Appendix 1 shows the structure of a free-list node, implemented in the C programming language, in accordance with the preferred embodiment of the present invention.

The aforementioned preferred methods comprise a particular control flow. There are many other variants of the preferred methods which use different control flows without departing the spirit or scope of the invention. Furthermore one or more of the steps of the preferred methods can be performed in parallel rather sequentially.

Figure 8:
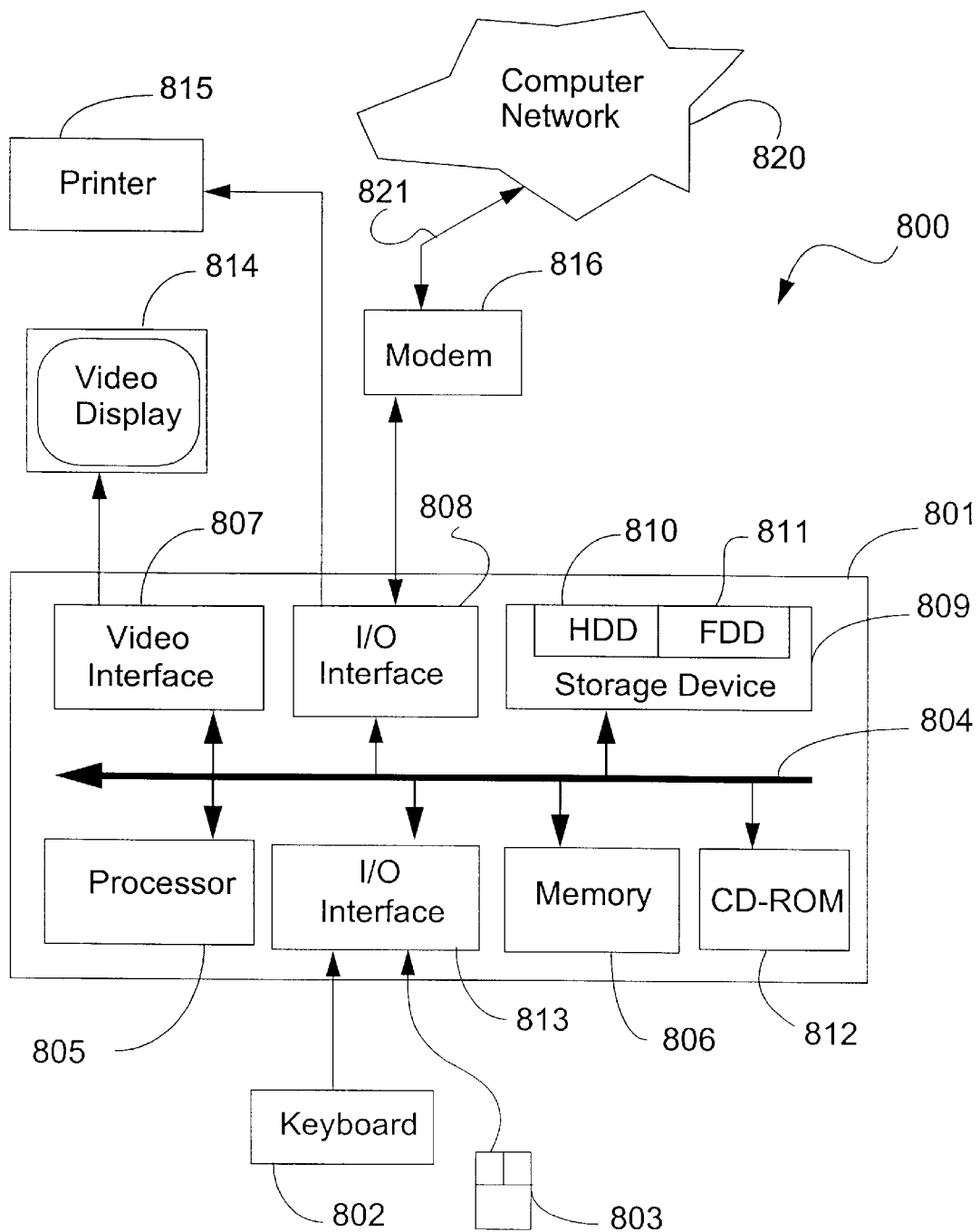
FIG. 8 is a schematic block diagram of a general purpose computer upon which the preferred embodiment of the present invention can be practiced; and Appendix 1 shows the structure of a free-list node, implemented in the C programming language, in accordance with the preferred embodiment of the present invention.

The method of dynamically allocating blocks of memory is preferably practiced using a conventional general-purpose computer system 800, such as that shown in FIG. 8 wherein the processes of FIGS. 1 to 7 can be implemented as software, such as an application program executing within the computer system 800. In particular, the steps of the methods of FIGS. 6 and 7 are effected by instructions in the software that are carried out by the computer. The software can be divided into two separate parts; one part for carrying out the method of dynamically allocating blocks of memory; and another part to manage the user interface between the latter and the user. The software can be stored in a computer readable medium, including the storage devices described below. For example, the memory allocator 2 can be realised by storing a memory allocation program on a CD-ROM. The software is loaded into the computer from the computer readable medium, and then executed by the computer. A computer readable medium having such software or computer program recorded on it is a computer program product. The use of the computer program product in the computer preferably effects an advantageous apparatus for determining pixel edge orientation for a pixel-based image in accordance with the embodiments of the invention.

The computer system 800 comprises a computer module 801, input devices such as a keyboard 802 and mouse 803, output devices including a printer 815 and a display device 814. A Modulator-Demodulator (Modem) transceiver device 816 is used by the computer module 801 for communicating to and from a communications network 820, for example connectable via a telephone line 821 or other functional medium. The modem 816 can be used to obtain access to the Internet, and other network systems, such as a Local Area Network (LAN) or a Wide Area Network (WAN).

The computer module 801 typically includes at least one processor unit 805, a memory unit 806, for example formed from semiconductor random access memory (RAM) and read only memory (ROM). The memory unit 806 will be the controlled memory 4 of the preferred embodiment. The free-list 8 of the preferred embodiment can be formed in the RAM. The computer module 801 also typically includes input/output (I/O) interfaces including a video interface 807, and an I/O interface 813 for the keyboard 802 and mouse 803 and optionally a joystick (not illustrated), and an interface 808 for the modem 816. A storage device 809 is provided and typically includes a hard disk drive 810 and a floppy disk drive 811. A magnetic tape drive (not illustrated) may also be used. A CD-ROM drive 812 is typically provided as a non-volatile source of data. The components 805 to 813 of the computer module 801, typically communicate via an interconnected bus 804 and in a manner which results in a conventional mode of operation of the computer system 800 known to those in the relevant art. Examples of computers on which the embodiments can be practised include IBM-PC's and compatibles, Sun Sparcstations or alike computer systems evolved therefrom.

Typically, the allocation program of the preferred embodiment is resident on the hard disk drive 810 and read and controlled in its execution by the processor 805. Intermediate storage of the program and any data fetched from the network 820 may be accomplished using the semiconductor memory 806, possibly in concert with the hard disk drive 810. In some instances, the application program may be supplied to the user encoded on a CD-ROM, as discussed above, or floppy disk and read via the corresponding drive 812 or 811, or alternatively may be read by the user from the network 820 via the modem device 816. Still further, the software can also be loaded into the computer system 800 from other computer readable medium including magnetic tape, a ROM or integrated circuit, a magneto-optical disk, a radio or infra-red transmission channel between the computer module 801 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of dynamically allocating blocks of memory can alternatively be implemented in dedicated hardware such as one or more integrated circuits performing the functions or sub functions of FIGS. 6 and 7. Such dedicated hardware can include graphic processors, digital signal processors, or one or more microprocessors and associated memories.

The foregoing describes only one embodiment/some embodiments of the present invention, and modifications and/or changes can be made thereto without departing from the scope and spirit of the invention, the embodiment(s) being illustrative and not restrictive.

APPENDIX 1

Styructure of a Free-List Node, in C

```
*
* A node in the free list.
*
* This is a dynamically sized structure, allocated with an independent fast
* allocator. Its size depends on the nodes level, and affects the number of
* forward pointers which exist at the end of the structure.
*
* Unlike a conventional skip list, each node in the freelist exists on two
* lists at a time, as mentioned above. Hence each node in the list has
* two meshed sets of forward pointers; the set used in list traversals
* depends on which order the list is being traversed in (i.e. by size or by
* address).
*
* The level of a given node is the same on each list, and the forward
* pointers at the end of the node consist of pairs of pointers for the
* address-ordered and size-ordered lists. Note that by meshing the
* pointers, we avoid the need to store the node's level in every node.
*/
struct ELM_FreeNode
{
    void    *fn_Base;       /* block base address */
    size_t  fn_Size;        /* size of the free block */
    struct
    {
        ELM_FreeNode *f_ByAddress;/* Next block in address-order */
        ELM_FreeNode *f_BySize;   /* Next block in size-order */
    } fn_Forward[1];  /* forward pointers */
};
```

What is claimed is:

1. A method of dynamically allocating blocks of memory in a computer system, the method including the steps of:

generating a first memory allocation list in which free memory blocks of any size are recorded, said first memory allocation list being ordered on the basis of size information associated with each of said free memory blocks;

generating a second memory allocation list in which said free memory blocks are recorded and ordered on the basis of memory block address information associated with each of said free memory blocks;

when a memory block request is generated by the computer system, searching a first list to determine a suitably sized memory block, allocating at least a portion of the suitably sized memory block in accordance with the request, and updating the size and address information in said first and second lists to take at least the portion allocated into account; and when a first memory block of any size is freed by the computer system:

determining whether one or more additional free memory blocks of any size exist adjacent said first memory block by searching the second list;

in the event that one or more additional free memory blocks exist adjacent said first memory block, merging said first memory block and said additional free memory blocks together to form a unitary free memory block; and updating said size and address information of the first and second lists to take said first memory block and any additional free memory blocks merged therewith into account.

2. A method of dynamically allocating blocks of memory according to claim 1, wherein the first and second lists are linked list data structures defined in part by a plurality of pointers.

3. A method of dynamically allocating blocks of memory according to claim 2, wherein pointers from the first and second lists are meshed to form an interconnected data structure.

4. A method of dynamically allocating blocks of memory according to claim 3, wherein the first and second lists take the form of skip-list.

5. A method of dynamically allocating blocks of memory according to claim 4, wherein the skip list defines a plurality of nodes, at least some of which define a plurality of elements having different levels, wherein each node is associated with a base memory address corresponding to a free memory block of a predetermined size, each element including a plurality of first and second pointer pairs, the first pointer in each pair pointing to a first element on the same level on the basis of address, and the second pointer in each pair pointing to a second element on the same level on the basis of block size.

6. An apparatus for dynamically allocating blocks of memory in a computer system, the apparatus including:

allocation list generating means for generating a first memory allocation list in which free memory blocks of any size are recorded, said first memory allocation list being ordered on the basis of size information associated with each of said free memory blocks and generating a second memory allocation list in which said free memory blocks are recorded and ordered on the basis of memory block address information associated with each of said free memory blocks;

searching means for searching a first list to determine a suitably sized memory block when a memory block request is generated by the computer system;

allocating means for allocating at least a portion of the suitably sized memory block in accordance with the request;

updating means for updating said size and address information in the first and second lists to take at least the portion allocated into account;

determining means for determining whether one or more additional free memory blocks of any size exist adjacent a first memory block, when said first memory block is freed by the computer system, by searching the second list utilising said searching means; and merging means for merging said first memory block and any of said additional free memory blocks together to form a unitary free memory block, in the event that one or more additional free memory blocks exist adjacent said first memory block, wherein said updating means updates said size and address information of the first and second lists to take said first memory block and any additional free memory blocks merged therewith into account.

7. An apparatus for dynamically allocating blocks of memory according to claim 6, wherein the first and second lists are linked list data structures defined in part by a plurality of pointers.

8. An apparatus for dynamically allocating blocks of memory according claim 7, wherein pointers from the first and second lists are meshed to form an interconnected data structure.

9. An apparatus for dynamically allocating blocks of memory according to claim 8, wherein the first and second lists take the form of skip-list.

10. An apparatus for dynamically allocating blocks of memory according to claim 9, wherein the skip list defines a plurality of nodes, at least some of which define a plurality of elements having different levels, wherein each node is associated with a base memory address corresponding to a free memory block of a predetermined size, each element including a plurality of first and second pointer pairs, the first pointer in each pair pointing to a first element on the same level on the basis of address, and the second pointer in each pair pointing to a second element on the same level on the basis of block size.

11. A computer readable memory medium for storing a program for an apparatus which processes data, said processing comprising a process for dynamically allocating blocks of memory in a computer system, said program comprising:

code for generating a first memory allocation list in which free memory blocks of any size are recorded, said first memory allocation list being ordered on the basis of size information associated with each of said free memory blocks;

code for generating a second memory allocation list in which said free memory blocks are recorded and ordered on the basis of memory block address information associated with each of said free memory blocks;

code for when a memory block request is generated by the computer system, searching a first list to determine a suitably sized memory block, allocating at least a portion of the suitably sized memory block in accordance with the request, and updating the size and address information in said first and second lists to take at least the portion allocated into account; and code for when a first memory block of any size is freed by the computer system:
  determining whether one or more additional free memory blocks of any size exist adjacent said first memory block by searching the second list;
  in the event that one or more additional free memory blocks exist adjacent said first memory block, merging said first memory block and said additional free memory blocks together to form a unitary free memory block; and
  updating said size and address information of the first and second lists to take said first memory block and any additional free memory blocks merged therewith into account.

12. A computer readable memory medium according to claim 11, wherein the first and second lists are linked list data structures defined in part by a plurality of pointers.

13. A computer readable memory medium according claim 12, wherein pointers from the first and second lists are meshed to form an interconnected data structure.

14. A computer readable memory medium according to claim 13, wherein the first and second lists take the form of skip-list.

15. A computer readable memory medium according to claim 14, wherein the skip list defines a plurality of nodes, at least some of which define a plurality of elements having different levels, wherein each node is associated with a base memory address corresponding to a free memory block of a predetermined size, each element including a plurality of first and second pointer pairs, the first pointer in each pair pointing to a first element on the same level on the basis of address, and the second pointer in each pair pointing to a second element on the same level on the basis of block size.

* * * * *